United States Patent
Hillhouse

(10) Patent No.: US 7,093,282 B2
(45) Date of Patent: Aug. 15, 2006

(54) METHOD FOR SUPPORTING DYNAMIC PASSWORD

(76) Inventor: Robert D. Hillhouse, Unit 4B, 120 Holland Avenue, Ottawa, Ontario (CA) K1Y 0X6

( * ) Notice: Subject to any disclaimer, the term of this patent is extended or adjusted under 35 U.S.C. 154(b) by 652 days.

(21) Appl. No.: 09/924,502

(22) Filed: Aug. 9, 2001

(65) Prior Publication Data

US 2003/0037262 A1    Feb. 20, 2003

(51) Int. Cl.
*H04L 9/32* (2006.01)

(52) U.S. Cl. .............................. 726/5; 726/18; 726/19; 380/28

(58) Field of Classification Search ................ 713/200, 713/202, 182; 380/28; 726/5, 18–19
See application file for complete search history.

(56) References Cited

U.S. PATENT DOCUMENTS

| 4,720,680 | A | * | 1/1988 | Nishihara et al. ........... 324/322 |
| 5,163,097 | A | | 11/1992 | Pegg |
| 5,608,387 | A | | 3/1997 | Davies |
| 5,664,699 | A | | 9/1997 | Kennedy et al. |
| 5,682,475 | A | | 10/1997 | Johnson et al. |
| 5,737,421 | A | | 4/1998 | Audebert |
| 5,821,933 | A | | 10/1998 | Keller et al. |
| 5,887,065 | A | * | 3/1999 | Audebert ..................... 713/172 |
| 5,937,068 | A | * | 8/1999 | Audebert ..................... 713/185 |
| 6,141,423 | A | | 10/2000 | Fischer |
| 6,148,406 | A | | 11/2000 | Weisz et al. |
| 6,209,104 | B1 | * | 3/2001 | Jalili ......................... 713/202 |
| 6,216,229 | B1 | | 4/2001 | Fischer |
| 6,421,667 | B1 | * | 7/2002 | Codd et al. .................... 707/4 |

FOREIGN PATENT DOCUMENTS

| DE | 3 818 132 A1 | 11/1989 |
| FR | 2 770 067 A1 | 4/1999 |
| WO | WO 00 41103 A1 | 7/2000 |
| WO | WO 00 62458 A2 | 10/2000 |

\* cited by examiner

*Primary Examiner*—Emmanuel L. Moise
*Assistant Examiner*—MinhDieu Nguyen
(74) *Attorney, Agent, or Firm*—Woodcock Washburn LLP

(57) ABSTRACT

A method of generating dynamic password is disclosed. A method of generating a dynamic password comprising the steps of providing a plurality of variable parameters, each parameter from the plurality of variable parameters being variable upon predetermined criteria; providing a plurality of predetermined static parameters; and processing at least some of the plurality of variable parameters and of the predetermined static parameters according to a dynamic password generating equation manipulating at least some of the plurality of variable parameters and of the predetermined static parameters resulting in an ordered sequence of dynamic and static parameters.

14 Claims, 3 Drawing Sheets

Fig. 1

Password dialog box

Login ID [ ]

Password [ ]

[ ENTER ]

Fig. 1a

Password dialog box

Login ID [ Smith ]

Password [ ***** ]

[ ENTER ]

METHOD FOR SUPPORTING DYNAMIC PASSWORD

The present invention relates to a method of generating passwords and more particularly to a method of generating a password that changes as a function of various parameters making the password dynamic.

BACKGROUND OF THE INVENTION

Security is fast becoming an important issue. It has always been an issue for everybody to protect his belongings. It is also well known that with the proliferation of computers and computer networks into all aspects of business and daily life—financial, medical, education, government, and communications—the concern over secure file access is growing. Using passwords is a common method of providing security. Password protection and/or combination type locks are employed for computer network security, automatic teller machines, telephone banking, calling cards, telephone answering services, houses, and safes. These systems generally require the knowledge of an entry code that has been selected by a user or has been preset.

Preset codes are often forgotten, as users have no reliable method of remembering them. Writing down the codes and storing them in close proximity to an access control device (i.e., the combination lock) results in a secure access control system with a very insecure code. Alternatively, the nuisance of trying several code variations renders the access control system more of a problem than a solution.

It is well known that a user determines a meaningful password, in the form of, for example, the name of their dog, the birth date of their child or an election year of the favorite candidate. This type of password is easily compromised with investigation. Conversely, a computer can randomly associate a password with a user, but this type of password is meaningless to the user and as such difficult to memorize. Consequently, the former method, which is simple, is insecure and the latter method, which is more secure, is difficult to use and often leads to a user writing their password next to their computer, thereby making the system insecure.

The multiplicity of protected system encountered in the daily life of an individual renders the use of a password particularly inconvenient, because a user has to remember a password for each accessible system. For example, the user must remember passwords for accessing network, database, E-mail, bank machine, personal voice mails at home and at work, etc. The plurality of the systems wherein a password is needed favors a single simple password for all systems. In addition, a skilled person may find a predetermined password given sufficient time, rendering the system insecure. In more sophisticated theft situations, "Trojan horse" type viruses can be used to capture a user ID number and password that have been entered at a keyboard or across a network connection. That is, the user thinks he is logging on as usual, but the dialogue box in which the data is entered is really a look-alike window that is capturing his keystrokes.

To secure access to a network, a further system was developed that relies on a user's personal information. A user requesting access to the network is prompted to answer a series of questions regarding his private life displayed on a computer screen. Such questions might be related to a relative's date of birth, a bone that was broken during childhood, a year of his first car accident, insurance company, address in January 1994, name of his first girlfriend, etc. The computer checks the validity of the answers before allowing access to the user. A computer is programmed with pertinent questions to ask a user and answers associated therewith, and when the system is initialised, the user enters the answers a first time, they are stored in a memory of the system, and are associated with the user identity. The time taken to answer all the questions prior to gaining access to the system is burdensome. It is evident that a major inconvenience with such a system is that a skilled person can find enough information of a personal nature relating to a user for answering properly the questions, and as such render the security ineffectual.

OBJECT OF THE INVENTION

To overcome such disadvantages, it is an object of this invention to provide a method for rendering a computer system access more secure.

It is another object of this invention to provide a method for generating a dynamic password.

It is a further object of this invention to provide a method for generating a dynamic password dependent on various dynamic parameters.

SUMMARY OF THE INVENTION

In accordance with a preferred embodiment of the present invention, there is provided a method of password verification comprising the steps of:

providing a process for transforming at least a variable parameter into an ordered string of characters, wherein the process sometimes results in different ordered strings of characters for a same variable parameter;

providing at least a variable parameter as a known password;

determining from data available to an individual and from the known password a static string;

providing the determined static string as a password for verification;

verifying the static string to determine that it is an accurate transformation of the at least a variable parameter according to the provided process and when the determination is that the transformation is accurate, providing an indication that the password is verified.

In accordance with another preferred embodiment of the present invention, there is provided a method of changing dynamic passwords comprising the steps of:

providing a string of characters, the string including indications of at least a parameter from a plurality of parameters, the at least a parameter being a variable parameter variable upon predetermined criteria;

receiving the provided string of characters; and, storing data based on the known password, the data sufficient for verifying provided passwords to determine their accuracy.

Advantageously, the invention provides a method of verifying a dynamic password comprising the steps of:

receiving a password comprising a string of characters wherein the characters are sequenced according to a predetermined sequence of variable parameters and static parameters;

identifying static parameters within the string of characters;

determining dynamic parameter values related to the dynamic parameters in accordance with the predetermined sequence;

comparing static parameters received within the string of characters with previously stored static parameters and the received dynamic parameter within the determined dynamic parameters to determine a first comparison result;

wherein upon the first comparison result being indicative of a match, the dynamic password is validated.

Further advantageously, the invention provides a method of generating a dynamic password comprising the steps of:

providing a process for transforming at least a variable parameter into an ordered string of characters, wherein the process sometimes results in different ordered strings of characters for a same variable parameter; and, providing at least a variable parameter as a password, the provided variable parameter provided by an individual via a data entry device.

BRIEF DESCRIPTION OF THE DRAWINGS

Exemplary embodiments of the invention will now be described in conjunction with the following drawings, in which:

FIG. 1 is a computer screen display of a password dialog box;

FIG. 1a is an example of a filled password dialog box on a computer screen display;

DETAILED DESCRIPTION OF THE INVENTION

Figure 2:
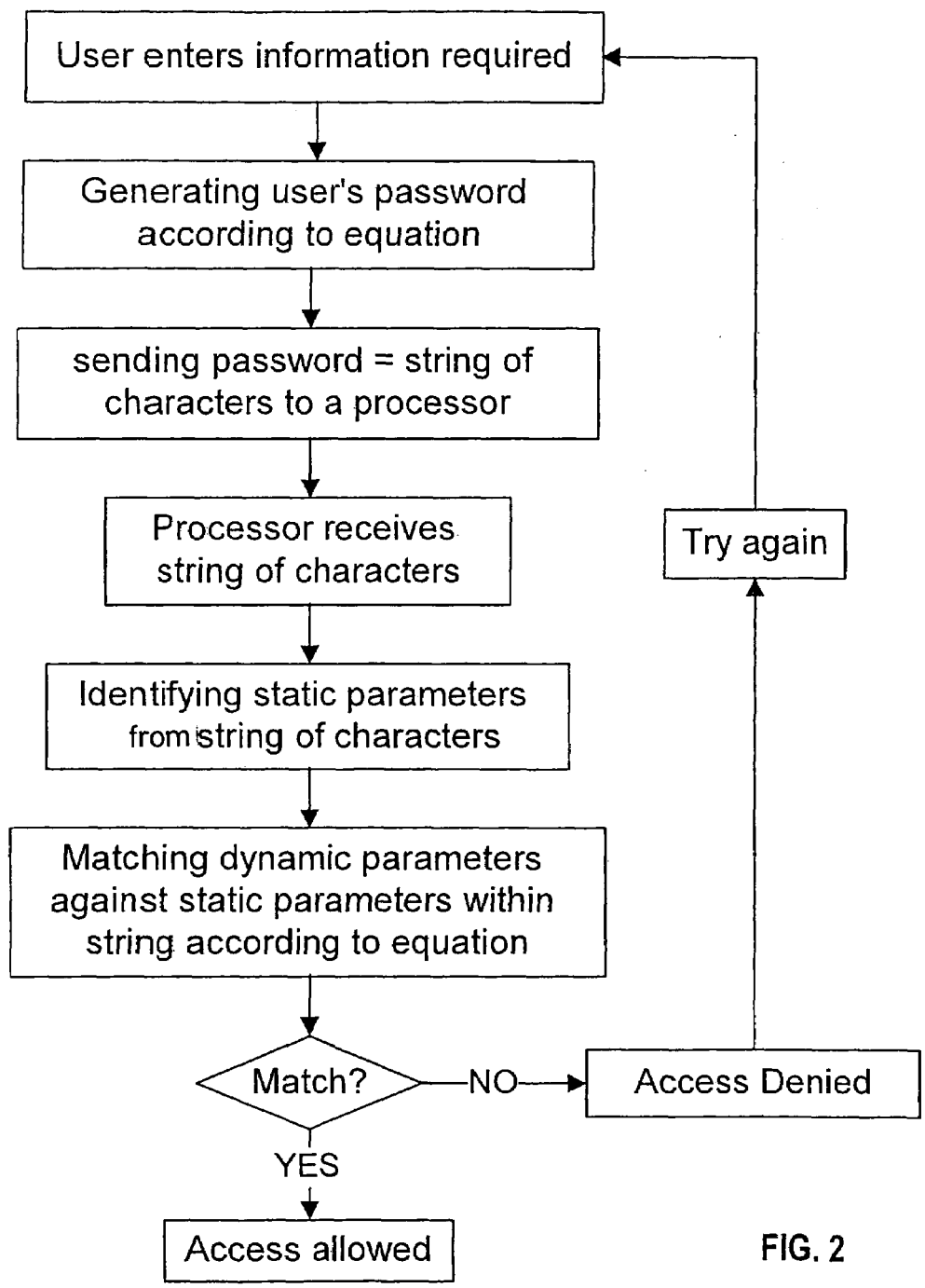
FIG. 2 is a flow diagram of a method of evaluating a dynamic password generated according to the present invention.

In many large companies, the computer system is organized as a network to reduce the cost of purchasing and installing software on all the stations existing in the company. A main advantage of using a network is to facilitate data accessibility to each employee. However, it is necessary to limit access of a company's network to the company's employees. As such, FIG. 1 is an example of a screen display prompting an employee to enter a login identity and an associated password to allow the employee to access the network. An example of a filled dialog box is shown in FIG. 1a. Classically, the login identity is the user's first name, illustrated here, as "Smith" and an exemplary password is "Fido", their dog's name. For security purposes, each character of the password is replaced with a star on the display so that nobody can read it. Each time a user is prompted to enter his password, the password is always identical to the one previously entered by the user unless the user has modified their password during a previous session. An ill-intentioned person can easily find out this type of static password and freely enter a company's network system.

Optionally, to make the system more difficult to break, the network system is organized in such a way that regularly all the employees are prompted to enter a new password. Often, the system allows the users to combine a non-determined number of letters, either small or capital, and digits in their passwords. However, due to the multiplicity of the systems and the recurrence of the demand, employees often use the same password to which a number is just added. For example, the "Fido" password becomes after a change request "Fido1". During the time period lasting between two successive modifications of a password, the password remains unchanged. A competent person may rapidly find out the password of a user and access a company's network.

As mentioned, the fact that the password remains unchanged during a long period of time between two modifications renders the system insecure. It will be advantageous to provide a security system based upon a dynamic password, i.e. a password comprising at least one parameter that changes in an uncontrollable way.

A most probable parameter that is uncontrollably variable is a parameter related to time. It is therefore advantageous to introduce a parameter related to the time in a dynamic password generation process because the time can be used in many ways such as hour of the day, day of the week/month, age, etc. By introducing at least a time parameter into a dynamic password generating equation, a password is automatically and deterministically different nearly every time it is used. The password mostly comprises some static or passive parameters such as the name of the user and perhaps also isolated letters that may complicate the determination of the password. An example of such a dynamic password generating equation is shown below:

$$\$hour+\text{``Smith2''}+\$mday+23+\text{``I''}+(\$hour+16)/2$$

Where the uncontrollably variable parameters are:
hour that represents the hour of the day, and mday that represents the day of the month.
Where the static parameters are:
Smith2 that represents the user's name and can be easily remembered by the user and I is an isolated letter.

The dollar sign indicates a variable parameter, and the quote sign is indicative of static parameters. Alternatively, the distinction between static and variable parameters is made another way or using other characters.

Assuming that a user wants to access the company's network at 8:22 am on May 25, and has the account Smith, she determines from the variable password equation her password at the present time. Here it is:

8Smith248I12 and enters it into the system which verifies it. Anyone trapping the password and storing it for later use will be sadly disappointed because the password will expire one hour later while Smith easily determines the correct password an hour later without needing to change the password on the system.

Of course, the predetermined equation shown here is just for illustrative purpose. In the present example, only two different variable parameters are in the equation, there is no limitation as to the number of these parameters or as to the number of static parameters. However, it is most probably difficult to introduce too many parameters in a single equation, either variable or passive, because the user has to remember them and their combination, and as such has to memorize at least the order in which the various parameters have to be entered. Advantageously, the parameters variable and passive are not difficult to memorize because they are certainly available and easily accessible by the user such as the hour of the day, the date or a name, a word of the day etc.

Referring now to FIG. 2, a flow diagram of a method of validating a dynamic password is illustrated. The user needs to know the equation for generating the dynamic password. In the present example the equation is:

$$\$hour+\text{``Smith2''}+\$mday+23+\text{``I''}+(\$hour+16)/2,$$

the user provides the hour of the day—"8"—, the characters "Smith2" followed by the value 48 being the day of the month plus 23, the letter "I" and 12 being (8+16)/2. The processor receives the string of characters for verifying the validity of the dynamic password. The processor generates a same password to verify that the user's password and then compares the characters within the string relative to the generated string according to the equation.

Eventually, a problem might rise when a password is entered at a time close to a change of the hour, for example. For example, assuming a variable parameter corresponds to the hour a user is entering a password, if the user's watch indicates 7:58 am, which is a time close to changing from 7 to 8, and the computer's watch has already turned over 8, the user might be rejected because the user password indicates a character 7 where the computer waits a 8. Even in these situations, it is easy for a user to either wait a few minutes or to realize that the system hour may be 7 or 8. Of course, synchronizing computers to the network password server clock will obviate this problem so long as users verify the time on their computers and not with their watches or desk clocks. Eventually, during a short period of time of a few minutes overlapping a change of hour as in the previous example, the network server accepts a password wherein the character indicative of the hour is incorrect within predetermined limits. In the previous example, the computer accepts password comprising the character 7 instead of 8 for indicating the hour. Similarly, if the user's watch indicates 8:02 am, and the computer's watch indicates 7:58 am, the computer accepts password comprising the character 8 instead of 7 for indicating the hour.

What may introduce a difficulty for a user are the numbers to memorize and eventually the operations to perform to complete the password. There are no prerequisites to incorporate operations in an equation for generating a dynamic password. Similarly, there is no prerequisite not to incorporate operations while elaborating or programming the dynamic password generating equation for securing a network access.

Figure 3:
FIG. 3 is an illustration of a computer screen displaying some possible images incorporated in the password.

In a further embodiment, the generation of a dynamic password relies again on a predetermined equation wherein an image is introduced as a parameter along with the variable and the static parameters. Referring to FIG. 3, a computer screen is displaying a plurality of images including various shapes, animals, trees, and different symbols. An image of a series as the one illustrated in FIG. 3 is part of a dynamic password generating equation. An example of such a dynamic password generating equation is shown below:

$hour+"Smith2"+$image

Where the variable parameter is: hour that represents the time of the day.

Where the static parameter is: Smith2—the user's name.

Where the image parameter is: image

Where the dollar sign indicates a variable parameter, the quote sign is indicative of a static parameter.

Assuming that the user wants to access her company's network at 8:22 am. An image is presented in the dialogue box asking for her password. For example, a tree may be displayed. In that instance, the user enters a password according to the above-predetermined dynamic password generating equation. The password will thus be in the form of:

8Smith2tree

Advantageously, an interpretation of the image is as valid as the image itself. For example, if the imaged tree is a pine, the password might reflect this particularity and incorporate the tree species. Moreover, English is not the exclusive language that can be used to describe a tree. Indeed, computers of large companies, especially international companies, are preferably programmed to accept passwords generated in any of a number of possible languages. Alternatively, only the user's mother tongue is accepted for a given password entry. Consequently, incorporating an image in the equation allows multiple other possibilities for the resulting password.

Back to the previous example and the possibilities allowed with a single image of a tree, here are 3 of the possible passwords:

8Smith2tree

8Smith2pine

8Smith2arbre

All the images are interpreted to a certain extent. For example, if an image of a bulb is selected, the possible words illustrating a bulb, not withstanding a foreign language, might be lamp, idea, light, lightbulb, bulb, eureka, etc. Of course the flexibility in image identification is a parameter that is set during system implementation or alternatively as an option to be set by a system administrator.

Thus, generating a dynamic password incorporating an image in the equation along with the variable and the static parameters also makes the system less secure when variability of many parameters is supported. That said, since the image is not immediately discernible to an unauthorized individual and its location within the password is unknown, it is believed that overall security will increase when the system is used by unconcerned individuals—individuals who are not specially trained in computer security.

In the example shown here, only one variable, one static, and one image parameter form part of the predetermined equation for generating the password but of course, there is no limitation as to the number of these parameters. The limit that may be taken into consideration is the good will of the user as to his capacity to memorize parameters to enter when prompted to do so. Additionally, there is no prerequisite to incorporate operations in the equation for generating a dynamic password. Similarly, there is no prerequisite not to incorporate operations while elaborating or programming the dynamic password generating equation for securing a network access.

Even though a dynamic password offers enormous advantages over static passwords, it is beneficial to have the possibility to change the password from time to time to decrease drastically the possibility to compromise security of the system. A way to achieve such beneficial possibility is to assign a code to the different parameters that compose a dynamic password. A code might be of various forms as for example an Arabic number, or a Roman numeral, or a letter, etc. The codes are assigned, for example, according to a predetermined setting or more probably are randomly assigned.

Referring to a previous example wherein the dynamic password generating equation was in the form of:

$hour+"name2"+$image

A first possibility is to determine as many codes as parameters in the equation. So in the present example, three codes are assigned:

| Possibility 1 | Possibility 2 | Possibility 3 |
|---|---|---|
| code 1 → hour | code 1 → name | code 1 → image |
| code 2 → name | code 2 → image | code 2 → hour |
| code 3 → image | code 3 → hour | code 3 → name |

-continued

| Possibility 4 | Possibility 5 | Possibility 6 |
|---|---|---|
| code 1 → hour | code 1 → name | code 1 → image |
| code 2 → image | code 2 → hour | code 2 → name |
| code 3 → name | code 3 → image | code 3 → hour |

An advantage in coupling codes to parameters is that the codes can be ordered arbitrarily by the server, allowing for a multiplicity of representations of a same password. Thus, intercepting the password equation is of limited value. Also, often codes are easier to enter than textual representations of parameters. Effectively, by changing the code assignment, the password though unchanged, appears differently to a Trojan Horse application and is therefore more difficult to decode. Also, it is unclear what each code entry refers to. Here, there exist 6 possibilities of reassigning the three codes to the three parameters, which leads to six different possible password entries resulting in the three identical parameters in the same sequence as in the Possibility 1.

To drastically increase the password's possibilities wherein the same dynamic and static parameters are initially required, the number of codes can exceed the number of parameters. For example, if 10 codes are available and 5 parameters are required for generating a dynamic password, the number of possibilities is increased according to the combination of 5 codes chosen from 10 to obtain an arrangement of the parameters identical to the arrangement required in the equation. Consequently, the number of possibilities is increased by about 252. Of course, these numbers are cited for exemplary purpose only, the number of codes available is not limited to any of the mentioned numbers.

Static parameters as used in the specification denote parameters that do not change. These can include string values and defined answers to questions that do not change. For example, "iQw4" is a string. Another static parameter is a user's name, employee number, address, etc. Which are determined and unchanging parameters. Of course, the static parameters can also be identified within passwords by encoded value in order to make interception of the password during password changes more difficult.

When a system has access to a significant amount of data, it is also possible to relate the password to data known to the system. Some example variable parameters include: days to a new moon, days until a product release, days since year end, months since hiring, years since hiring, employee age in years, months since last vacation week, number of people on vacation within a person's group, amount on last paycheck, taxes deducted on last paycheck, amount in employee savings plan, and so forth. Also, posted data is useful such as today's lunch menu items, word of the day, and so forth.

In order to verify a password when provided, there are several possible methods. According to a preferred embodiment, the static portions of the password are hashed either separately or in a concatenated or other joined form. The hashed value is stored. When a password is received, it is separated into static and dynamic values. The dynamic values are regenerated to verify the dynamic values. The static values are hashed and the hash values are compared. As such, the resulting static portions are not stored on the server and cannot be detected by a snooping device. The dynamic parameters are stored in an encoded fashion that is typically other than human intelligible. For example, if 256 variable parameters are known, the variable parameters are stored as 8 bit values.

Alternatively, the dynamic values are verified without regenerating same. For example, if the variable parameter is day of month+23, then the verification process merely subtracts 23 from the provided value and compares the result to the present day of the month. Of course, other methods of password verification are possible.

Advantageously, the dual composition of these passwords, i.e. dynamic and static values renders the dynamic passwords usable with various existing system without requiring any other support. Typically, a password is used for activating encryption keys for encrypting data. Advantageously, the static values of a dynamic password are used as keys like typical passwords. However, the presence of dynamic values in combination with the static values in a dynamic password increases the security of the system. That said, even if static values are potentially accessible to an unauthorized individual, their location within the password is unknown. Therefore, accessibility to encryption data is possible thanks to the static values and moreover, the accessibility is protected by the dynamic values.

Numerous other embodiments might be envisioned without departing from the scope and the spirit of the present invention. For example, the description of the invention implicitly inferred that the dynamic password generating equation was identical for all the employees of a company. The difference between the dynamic passwords of two employees logging in at the same time can be the static parameters. However, each employee can have a specific dynamic password generating equation. The multiplicity of equations, i.e. as many equations as employees, might be advantageous if an employee leaves the company. In such a case, the equation is deleted and nobody else in the company is affected, otherwise, the whole system must adapt to the departure for keeping the system as secure as possible.

What is claimed is:

1. A method of password verification comprising:
    providing a process for transforming at least a variable parameter into an ordered string of characters, wherein the process sometimes results in different ordered strings of characters for a same variable parameter;
    providing at least a static parameter and at least a variable parameter selected from a plurality of variable parameters as a known password, the known password modifiable, as to the selected at least a variable parameter and as to a location and order of the at least a variable parameter within the known password;
    determining from data available to an individual and from the known password a static string;
    providing the determined static string as a password for verification; and
    verifying the static string to determine that it is an accurate transformation of the at least a variable parameter according to the provided process and when the determination is that the transformation is accurate, providing an indication that the password is verified, wherein the known password is provided by a user and the static string is provided by the user, wherein the known password is entered as a string of characters and wherein at least a character of the string of characters is indicative of a variable parameter and wherein the string of characters is parsable to form the known password, the parsing distinguishing variable parameters from static parameters within the known password.

2. A method according to claim 1, wherein the step of verifying the static string includes:
  performing the process for transforming at least a variable parameter on the known password to determine a second static string;
  comparing the provided static string with the second static string to determine a comparison result; and,
  when the comparison result is indicative of a match, providing an indication that the password is verified.

3. A method according to claim 1, wherein the at least a variable parameter includes an uncontrollably variable parameter.

4. A method according to claim 1, wherein the process includes determining from present time data, a current value for a variable parameter relating to time.

5. A method according to claim 1, wherein the process includes providing data to a user for interpretation by the user and then comparing the user's interpretation to a predetermined known interpretation.

6. A method according to claim 5, wherein the provided data is an image and the interpretation is a string indicative of the image.

7. A method of password verification comprising:
  providing a process for transforming at least a variable parameter into an ordered string of characters, wherein the process sometimes results in different ordered strings of characters for a same variable parameter, the process including providing data to a user for interpretation by the user and then comparing the user's interpretation to a predetermined known interpretation;
  providing at least a static parameter and at least a variable parameter selected from a plurality of variable parameters as a known password, the known password modifiable, as to the selected at least a variable parameter and as to a location and order of the at least a variable parameter within the known password;
  determining from data available to an individual and from the known password a static string;
  providing the determined static string as a password for verification; and
  verifying the static string to determine that it is an accurate transformation of the at least a variable parameter according to the provided process and when the determination is that the transformation is accurate, providing an indication that the password is verified.

8. A method according to claim 7, wherein the step of verifying the static string includes:
  performing the process for transforming at least a variable parameter on the known password to determine a second static string;
  comparing the provided static string with the second static string to determine a comparison result; and
  when the comparison result is indicative of a match, providing an indication that the password is verified.

9. A method according to claim 7, wherein the at least a variable parameter includes an uncontrollably variable parameter.

10. A method according to claim 7, wherein the process includes determining from present time data, a current value for a variable parameter relating to time.

11. A method according to claim 7, wherein the provided data is an image and the interpretation is a string indicative of the image.

12. A method according to claim 7, wherein the known password is provided by a user and the static string is provided by the user.

13. A method according to claim 12, wherein the known password is entered as a string of characters and wherein at least a character of the string of characters is indicative of a variable parameter.

14. A method according to claim 13, wherein the string of characters is parsable to form the known password, the parsing distinguishing variable parameters from static parameters within the known password.

* * * * *